United States Patent
Lee

(10) Patent No.: US 6,760,586 B1
(45) Date of Patent: Jul. 6, 2004

(54) SYSTEM AND METHOD FOR PROCESSING A HANDOVER OF DIGITAL ENHANCED CORDLESS TELECOMMUNICATION (DECT) LINE CARDS IN A SWITCHING SYSTEM

(75) Inventor: Kon Ju Lee, Kyongki-do (KR)

(73) Assignee: LG Electronics Inc., Seoul (KR)

( * ) Notice: Subject to any disclaimer, the term of this patent is extended or adjusted under 35 U.S.C. 154(b) by 370 days.

(21) Appl. No.: 09/657,975

(22) Filed: Sep. 8, 2000

(30) Foreign Application Priority Data

Sep. 10, 1999 (KR) ........................................ 1999/38746

(51) Int. Cl.$^7$ ................................................ H04Q 7/20
(52) U.S. Cl. ...................... 455/436; 455/462; 455/465; 370/331; 370/465
(58) Field of Search ................................ 455/465, 436, 455/426, 438, 462; 370/331, 516, 465, 467

(56) References Cited

U.S. PATENT DOCUMENTS

| | | | | |
|---|---|---|---|---|
| 5,418,838 A | * | 5/1995 | Havermans et al. | 455/465 |
| 5,898,929 A | * | 4/1999 | Haartsen | 455/462 |
| 5,903,846 A | * | 5/1999 | Finch et al. | 455/462 |
| 5,946,628 A | * | 8/1999 | Veloso et al. | 455/465 |
| 5,978,369 A | * | 11/1999 | Silvestre et al. | 370/350 |
| 6,023,627 A | * | 2/2000 | Fuchisawa | 455/462 |
| 6,226,515 B1 | * | 5/2001 | Pauli et al. | 455/426 |
| 6,400,949 B1 | * | 6/2002 | Bielefeld et al. | 455/434 |

* cited by examiner

Primary Examiner—William Trost
Assistant Examiner—Sharad Rampuria
(74) Attorney, Agent, or Firm—Fleshner & Kim, LLP

(57) ABSTRACT

A system and method for processing external handover of Digital Enhanced Cordless Telecommunication (DECT) line cards in a private switching system are disclosed. The DECT system in a private switching system has a plurality of DECT line cards, which are divided into a master line card and slave line cards, so as to perform the signaling protocol for the handover between the subscribers accommodated in the different DECT line cards without a CCFP. The method includes setting at least one DECT line card as a master line card, and setting the remaining cards as slave line cards, setting at least one Burst Mode Controller (BMC) as a master BMC and the remaining ones as slave BMCs, and generating a synchronous clock in the master BMC. The synchronous clock is applied to the slave BMCs, and signaling protocol information is analyzed in the master line card. The analyzed result of the information is provided to each of the slave line cards in accordance with the synchronous clock. The handover between subscribers is thus performed by means of a communication protocol.

23 Claims, 3 Drawing Sheets

SYSTEM AND METHOD FOR PROCESSING A HANDOVER OF DIGITAL ENHANCED CORDLESS TELECOMMUNICATION (DECT) LINE CARDS IN A SWITCHING SYSTEM

BACKGROUND OF THE INVENTION

1. Field of the Invention

The present invention relates to switching in a communication system, and more particularly to a system and method for processing an external handover of Digital Enhanced Cordless Telecommunication (DECT) line cards in a private switching system.

2. Background of the Related Art

In order to employ a DECT system in a private switching system, a DECT line card is installed in the switching system, and the corresponding line card is connected to a base station.

In the existing DECT system, however, only one DECT line card can be installed in the switching system. Large-capacity private switching systems having a large number of wireless subscribers thus experience problems due to this limitation. Accordingly, there have been many attempts to install at least two line cards in a private switching system.

FIG. 1 shows one such system, having a plurality of line cards 10-1 to 10-N, a Common Control Fixed Part (CCFP) 20, and a plurality of Subscriber Line Circuit (SLC) 30-1 to 30-M. Each of the plurality of line cards 10-1 to 10-N includes a plurality of Burst Mode Controller (BMC) 11-1 to 11-8N.

Each of the line cards 10-1 to 10-N can be connected to a maximum number of eight base stations, each of which can accommodate twelve subscribers. Therefore, each of the line cards 10-1 to 10-N can accommodate up to a maximum of ninety-six subscribers.

In the related art switching system having the construction as described above, the ninety-six subscribers accommodated in the same line card use the same synchronous clock. Thus, there is no problem in the handover between the ninety-six subscribers connected to the same one of the line cards 10-1 to 10-N. However, the CCFP 20 controlling all of the line cards 10-1 to 10-N in the system is required to achieve the handover between the subscribers accommodated in different line cards 10-1 to 10-N. Specifically, the CCFP 20 outputs master synchronous clocks, which all of the line cards 10-1 to 10-N use. This enables the handover between the subscribers accommodated in each of the line cards 10-1 to 10-N.

In order to perform the handover between the subscribers accommodated in each of the line cards 10-1 to 10-N, the CCFP 20 executes a signaling protocol. To execute the signaling protocol, the CCFP 20 analyzes all information for the signaling protocol for the handover between the subscribers accommodated in the all of the line cards 10-1 to 10-N, and applies orders according to the result of the analysis to each of the line cards 10-1 to 10-N. Accordingly, to achieve a seamless handover between subscribers accommodated in each of the line cards 10-1 to 10-N, the signaling signal of each of the line cards 10-1 to 10-N is supplied as protocol data between the subscribers accommodated in all of the line cards 10-1 to 10-N by means of the CCFP 20.

Further, the CCFP 20 applies an order for providing other functions, such as an Adaptive Differential Pulse Code Modulation (ADPCM) interfacing, switching, echo elimination, PCM interfacing, and the like, to each of the line cards 10-1 to 10-N. The BMCs 11-1 to 11-8N contained in each of the line cards 10-1 to 10-N carry out a series of operations for executing the protocol for the handover, according to a reception of the order.

The related art switching system has various problems. For example, it is difficult to add the related art CCFP 20 in a private switching system. Accordingly, to employ multi-line cards in such a private switching system, the system construction of the private switching system has to be redesigned to add the CCFP 20 into the system. This redesign makes the system more complicated, and increases the expense due to the addition of the CCFP.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a system and method for processing external handover of DECT line cards in a private switching system that substantially obviates the problems caused by disadvantages of the related art.

Another object of the invention is to provide a system and method for processing external handover of DECT line cards in a private switching system, in which a DECT system integrated in the private switching system has a plurality of DECT line cards, which are divided into a master line card and a plurality of slave line cards.

It is another object of this invention to perform the signaling protocol for the handover between subscribers accommodated in different DECT line cards without using a CCFP.

To achieve these and other advantages in whole or in parts, there is provided a method for processing handover of Digital Enhanced Cordless Telecommunication (DECT) line cards in a private switching system, including setting at least one as a master line card and remaining ones as slave line cards from among a plurality of DECT line cards by means of switching means; setting at least one as a master Burst Mode Controller (BMC) and remaining ones as slave BMCs from among a plurality of BMCs in the master line card, and generating a synchronous clock in the master BMC, and then applying the synchronous clock to the slave BMCs, and analyzing information about a signaling protocol in the master line card, and applying an analyzed result of the information to each of the slave line cards in accordance with the synchronous clock, so as to perform the handover between subscribers by means of a communication protocol.

To further achieve these and other advantages in whole or in parts, there is provided a system for processing handover of DECT line cards in a private switching system, including at least a master line card; a plurality of slave line cards controlled by the master line card; and a backplane for providing signal lines for protocol between the master line card and the slave line cards.

In the system and the method according to a preferred embodiment of the present invention, a plurality of DECT line cards are divided into a master line card and a plurality of slave line cards, and the signaling is performed between the line cards through an HDLC protocol. This simplifies the construction of the system, and adapts the DECT system to be integrated in the private switching system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The above and other objects, characteristics, and advantages of the present invention will become apparent from the following description along with the accompanying drawings.

Figure 1:
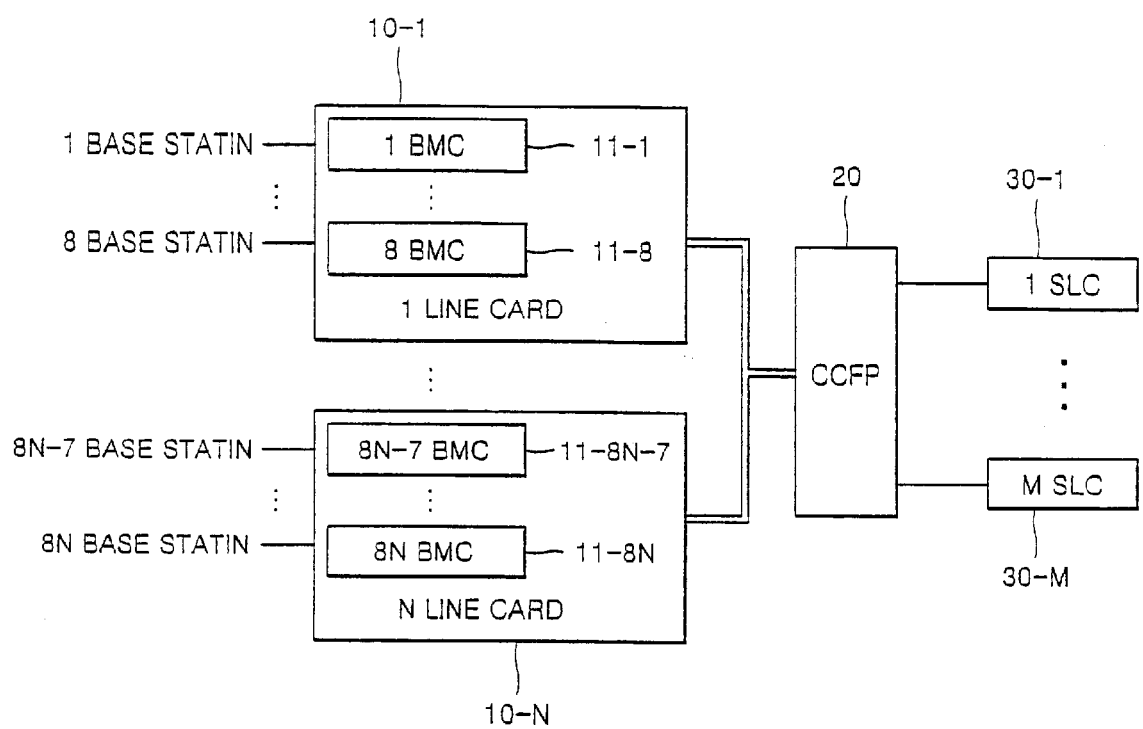
FIG. 1 is a block diagram of a related art switching system.
Figure 2:
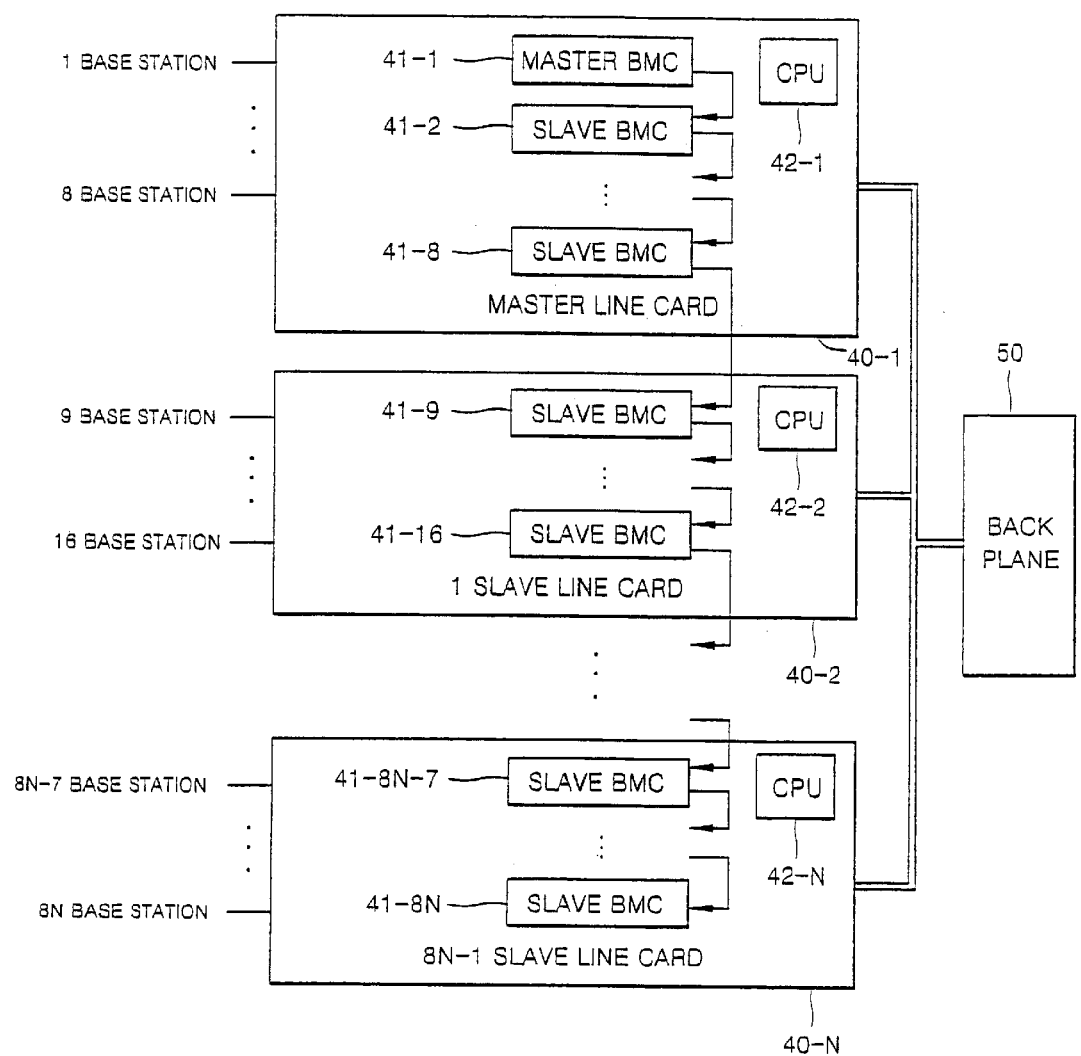
FIG. 2 is a block diagram of a private switching system employing a system for processing external handover of DECT line cards according to a preferred embodiment of the present invention.

Referring to FIG. 2, a switching system employing system and method of processing external handover of DECT line cards according to a preferred embodiment of the present invention preferably includes a plurality of DECT line cards 40-1 to 40-N. One line card, for example, 40-1, is set as a master line card, and the other line cards 40-2 to 40-N are set as slave line cards. Such a setting is preferably done by a user utilizing a flag or a switch. The line cards are respectively connected to a backplane 50, preferably through a PCM highway and a signaling highway.

Each of the line cards 40-1 to 40-N preferably includes a plurality of BMCs 41-1 to 41-8N and a CPU 42-1 to 42-N. In the master line card 40-1, one BMC from among the BMCs 41-1 to 41-8N is set as a master BMC (for example, 41-1), and the other BMCs are set as slave BMCs 41-2 to 41-8N.

The master line card 40-1 controls the slave line cards 40-2 to 40-N, preferably using a High-level Data Link Control (HDLC) protocol of CPU 42-1 to 42-N. Thus, the master line card 40-1 performs a signaling protocol function of the related art CCFP, thereby eliminating the necessity for the CCFP in the preferred embodiment of the invention.

Four back signals for connecting the line cards 40-1 to 40-N with each other are needed for the master line card 40-1 to control the slave line cards 40-2 to 40-N. Additionally, the HDLC protocol requires four sets of data for signaling, including reception data, transmission data, control data, and reset data. Accordingly, four lines are preferably connected into the backplane 50, so as to process reception and transmission of the data.

Next, a system and method for processing an external handover of DECT line cards in a private switching system according to a preferred embodiment of the present invention will be described with reference to FIGS. 2 and 3.

Figure 3:
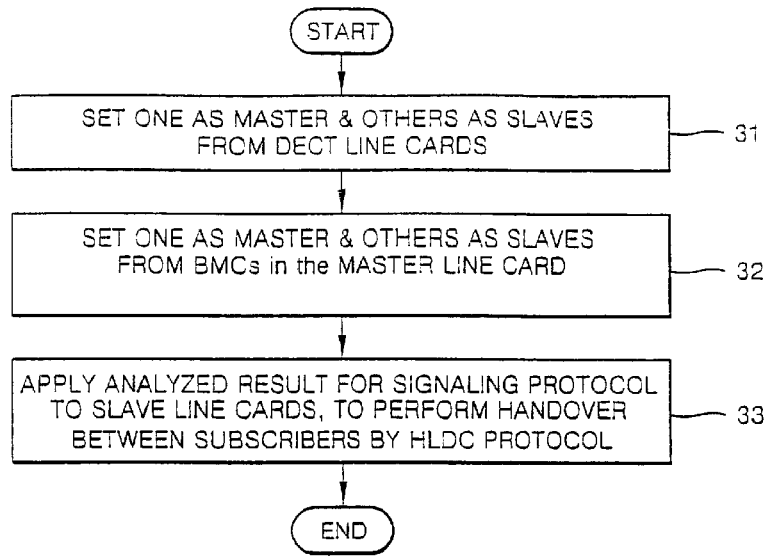
FIG. 3 is a drawing showing a method for processing external handover of DECT line cards in a private switching system according to a preferred embodiment of the present invention.

Referring to FIG. 3, a line card is selected, preferably by a user, from among a plurality of DECT line cards 40-1 to 40-N, and is set as a master line card 40-1, preferably by means of a flag or a switch. For example, when the user sets the first line card 40-1 as the master card from among the multiple DECT line cards 40-1 to 40-N, the first card is read to be the master card. It accordingly executes the HDLC protocol as a master line card 40-1. The other DECT line cards 40-2 to 40-N are read to be the slave line cards, and execute the HDLC protocol as the slave line cards 40-2 to 40-N, by the flag or the switch (step 31).

Next, a BMC is set to be the master BMC, for example BMC 41-1. The master BMC 41-1 contained in the master line card 40-1 generates a synchronous clock signal and applies it to a first slave BMC 41-2 of lower rank. The first slave BMC 41-2 then applies the synchronous clock signal to a second slave BMC 41-3. In this way, the synchronous clock is sequentially applied from the higher ranking slave BMCs to the lower ranking slave BMCs (step 32). Accordingly, all of the slave line cards 40-2 to 40-N receive the synchronous clock outputted from the master line card 40-1. This enables the handover between the subscribers accommodated in all of the DECT line cards 40-1 to 40-N. In this case, the master line card 40-1 analyzes all information about the signaling protocol (HDLC protocol) for the handover between the subscribers accommodated in all of the DECT line cards 40-1 to 40-N, and then applies an order according to the analyzed result to the slave line cards 40-2 to 40-N correspondingly to the synchronous clock (step 33).

Figure 4:
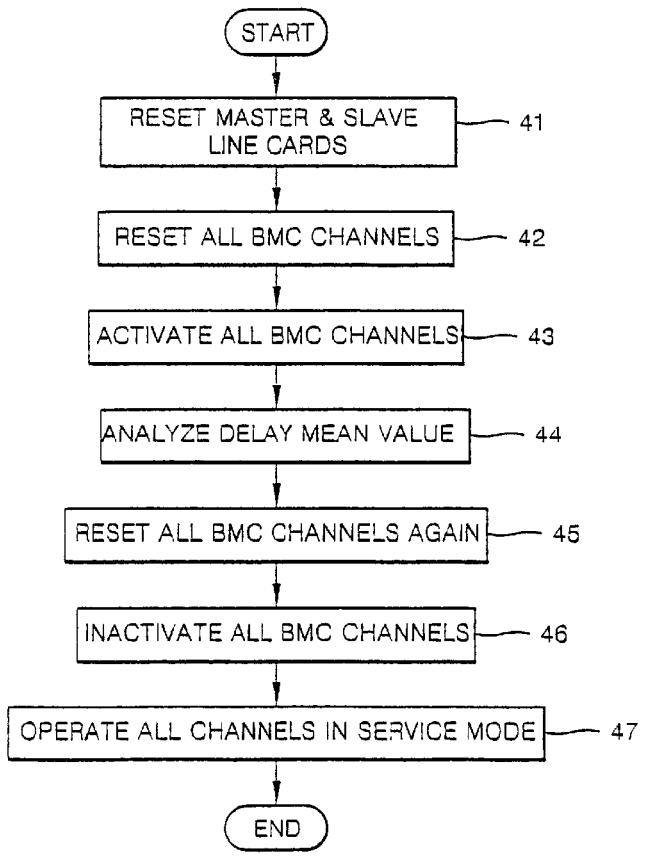
FIG. 4 is a drawing showing a process for performing an HDLC protocol in the method for processing external handover of DECT line cards in a private switching system of FIG. 3.

The process for performing the HDLC protocol will be briefly described with reference to FIG. 4. First, the master line card 40-1 resets itself, and then transmits the reset data to all of the slave line cards 40-2 to 40-N by means of the CPU 42-N. This resets all of the slave line cards 40-2 to 40-N and all of the BMC channels (steps 41 and 42). Further, the master line card 40-1 activates all of the BMC channels (step 43), and then confirms delay values of all of the BMC channels to analyze a delay mean value (step 44). Thereafter, the master line card 40-1 again resets all of the BMC channels according to the analyzed delay mean value (step 45), and inactivates all of the BMC channels (step 46). Accordingly, all of the channels are warm-started to perform operation in a service mode (step 47). Then, the process for performing the HDLC protocol is completed.

The system and the method for processing external handover of DECT line cards in a private switching system according to the present invention as embodied and broadly described herein has several advantages. For example, a DECT system integrated in the private switching system includes a plurality of DECT line cards, which are divided into a master line card and a plurality of slave line cards. Therefore, the handover between a large number of subscribers can be accomplished without problems by employing a prescribed number of the DECT line cards capable of accommodating a corresponding number of subscribers in the conventional private switching system. Furthermore, the number of subscribers can be increased without limit by adding a necessary number of the DECT line cards in the private switching system, without modifying the construction of the private switching system. Moreover, the private switching system has a simplified construction, and can be easily operated by an operator. Additionally, because this system has a simplified construction, it is less expensive.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for processing handover of Digital Enhanced Cordless Telecommunication (DECT) line cards in a private switching system, comprising:
    setting at least one of a plurality of DECT line cards as a master line card;
    setting remaining ones of the plurality of DECT line cards as slave line cards;
    setting at least one of a plurality of Burst Mode Controllers (BMC) in the master line card as a master BMC;
    setting remaining ones of the plurality of BMCs as slave BMCs, wherein the setting the master line card and slave line cards is performed by switching means;
    generating a synchronous clock in the master BMC, and providing the synchronous clock to the plurality of BMCs; and
    analyzing signaling protocol information in the master line card, and using an analyzed result of the information with the synchronous clock to perform the handover between subscribers in accordance with a communication protocol.

2. The method of claim 1, wherein the switching means is one of a flag and a switch.

3. The method of claim 1, wherein the communication protocol is a High-level Data Link Control (HDLC) protocol.

4. The method of claim 1, wherein the step of performing the handover in accordance with the communication protocol comprises:
    resetting the BMC channels in the master line card and the slave line cards by the master line card;
    activating the BMC channels and analyzing a delay mean value of the BMC channels;
    resetting the BMC channels again according to the analyzed delay mean value, and then inactivating the BMC channels; and
    warm-starting the BMC channels and operating the BMC channels in a service mode.

5. The method of claim 1, wherein the signaling protocol information comprises transmission data, reception data, control data, and reset data.

6. A Digital Enhanced Cordless Telecommunication (DECT) line card handover system, comprising:
    a master line card coupled to at least one base station;
    a plurality of slave line cards communicatively coupled to the master line card, and each coupled to at least one base station; and
    a backplane to provide signal lines for protocol communication between the master line card and the slave line cards, wherein each of the plurality of slave line cards is controlled by the master line card, wherein the master line card comprises a first CPU, a master Burst Mode Controller (BMC), and at least one slave BMC.

7. The system of claim 6, wherein the master line card controls the slave line cards through the first CPU using a High-Level Data Link Control (HDLC) protocol.

8. The system of claim 7, wherein each of the slave line cards comprises a second CPU and a plurality of slave BMCs, and wherein the master line card controls the slave line cards through corresponding ones of the second CPU using the HDLC protocol.

9. The system of claim 6, wherein the backplane uses prescribed back signals, and wherein the master line card controls the slave line cards using a High-Level Data Link Control (HDLC) protocol of CPUs in each of the master line card and the slave line cards.

10. The system of claim 9, wherein prescribed lines are connected into the backplane, so as to process at least one of reception and transmission of HDLC protocol information and corresponding data.

11. The method of claim 1, wherein the master line card controls the plurality of BMCs using a first CPU performing a High-Level Data Link Control (HDLC) protocol, wherein the master line card comprises the first CPU and the plurality of BMCs.

12. The method of claim 4, wherein the communication protocol is a High-level Data Link Control (HDLC) protocol.

13. A method of controlling Digital Enhanced Cordless Telecommunication (DECT) line cards, comprising:
    setting a first BMC in a first DECT line card as a master BMC, and setting remaining BMCs within the first DCT line card and in at least one second DCT line card as slave BMCs;
    generating a synchronization signal in the first DECT line card; and
    performing a signaling protocol function to control the at least one second DECT line card using the synchronization signal.

14. The method of claim 13, wherein a handover of subscribers between DECT line cards is processed in accordance with the synchronous clock signal and a communication protocol.

15. The method of claim 14, wherein the communication protocol is a High-level Data Link Control (HDLC) protocol.

16. The method of claim 13, wherein the signal protocol function is enabled through a backplane coupled to each of the DECT line cards.

17. The method of claim 16, wherein signal protocol information comprises transmission data, reception data, control data, and reset data.

18. The method of claim 15, wherein the step of performing the handover in accordance with the communication protocol comprises:
    resetting Burst Mode Controller (BMC) channels in the first DECT line card and the plurality of second DECT line cards by the first DECT line card;
    activating the BMC channels and analyzing a delay mean value of the BMC channels;
    resetting the BMC channels again according to the analyzed delay mean value, and then activating the BMC channels; and
    warm-starting the BMC channels and operating the BMC channels in a service mode.

19. The method of claim 1, wherein the analyzed result of the information applies to each of the slave line cards in accordance with the synchronous clock.

20. The method of claim 1, wherein each of the plurality of DECT line cards is configured to communicate with at least one base station.

21. The method of claim 13, wherein the first DECT line card is configured to perform communication with at least one base station.

22. The method of claim 13, wherein the first DECT line card is a master DECT line card, and wherein a first Burst Mode Controller of the master DECT line card is set as a master BMC.

23. The method of claim 22, wherein the master BMC generates the synchronous signal.

* * * * *